US011866263B2

(12) United States Patent
Graff et al.

(10) Patent No.: US 11,866,263 B2
(45) Date of Patent: Jan. 9, 2024

(54) BELT CONVEYOR CAPABLE OF CONVEYING OILSEED PRODUCTS

(71) Applicant: Brandt Industries Inc., Regina (CA)

(72) Inventors: Lyndon Graff, Craven (CA); Jonathan Robert Carteri, Regina (CA)

(73) Assignee: Brandt Industries Inc., Regina (CA)

( * ) Notice: Subject to any disclaimer, the term of this patent is extended or adjusted under 35 U.S.C. 154(b) by 15 days.

(21) Appl. No.: 17/563,325

(22) Filed: Dec. 28, 2021

(65) Prior Publication Data

US 2022/0119205 A1    Apr. 21, 2022

Related U.S. Application Data

(62) Division of application No. 16/838,065, filed on Apr. 2, 2020, now Pat. No. 11,242,209.

(30) Foreign Application Priority Data

Jun. 17, 2019 (CA) ...................................... 3046751

(51) Int. Cl.
*B65G 15/08* (2006.01)
*B65G 21/20* (2006.01)
(Continued)

(52) U.S. Cl.
CPC ............. *B65G 15/08* (2013.01); *B65G 15/44* (2013.01); *B65G 15/56* (2013.01); *B65G 21/2081* (2013.01); *B65G 23/10* (2013.01); *B65G 23/12* (2013.01); *B65G 45/12* (2013.01); *B65G 45/26* (2013.01); *B65G 47/66* (2013.01); *B65G 41/008* (2013.01); *B65G 47/18* (2013.01); *B65G 2201/042* (2013.01);
(Continued)

(58) Field of Classification Search
CPC ........ B65G 15/08; B65G 15/44; B65G 15/56; B65G 21/2081; B65G 23/10; B65G 23/12; B65G 41/00; B65G 41/008; B65G 45/12; B65G 45/14; B65G 45/16; B65G 45/26; B65G 47/18; B65G 2201/042; B65G 2811/0657; B65G 2812/02118; B65G 2812/02198
See application file for complete search history.

(56) References Cited

U.S. PATENT DOCUMENTS 810,510 A    1/1906 Robins
874,982 A    12/1907 Norton
(Continued)

*Primary Examiner* — Gene O Crawford
*Assistant Examiner* — Keith R Campbell
(74) *Attorney, Agent, or Firm* — Frost Brown Todd LLP; Nicole M. Tepe

(57) ABSTRACT

A belt and a belt conveyor are provided for transporting particulate material and especially oilseeds up the belt conveyor. The belt conveyor can include an intake end having a hopper, a discharge end, a body extending between the intake end and the discharge end and a belt. The belt travels along a travel path in the belt conveyor; the belt traveling through the hopper, up an upper run in the body to the discharge end, down a return run in the body, and back through the hopper. The belt can have a top surface having pairs of adjacent ridges provided on the top surface, each ridge having a pair of arms extending from a point, in a travel direction of the belt, wherein each pair of adjacent ridges define a v-channel on the top surface of the belt.

13 Claims, 11 Drawing Sheets

(51) Int. Cl.
  *B65G 15/44* (2006.01)
  *B65G 15/56* (2006.01)
  *B65G 45/12* (2006.01)
  *B65G 23/10* (2006.01)
  *B65G 23/12* (2006.01)
  *B65G 45/26* (2006.01)
  *B65G 47/66* (2006.01)
  *B65G 47/18* (2006.01)
  *B65G 41/00* (2006.01)

(52) U.S. Cl.
  CPC ............... *B65G 2811/0657* (2013.01); *B65G 2812/02118* (2013.01); *B65G 2812/02198* (2013.01)

(56) References Cited

U.S. PATENT DOCUMENTS

| | | | | |
|---|---|---|---|---|
| 1,728,131 | A * | 9/1929 | Noecker | B65G 45/12 198/866 |
| 1,729,322 | A * | 9/1929 | Barber | B65G 43/00 198/497 |
| 2,536,961 | A | 1/1951 | Smith | |
| 3,865,232 | A * | 2/1975 | Koenig | B65G 45/12 198/497 |
| 3,875,613 | A * | 4/1975 | Pincus | B65G 45/12 241/101.5 |
| 3,910,405 | A | 10/1975 | Couperus et al. | |
| 4,944,386 | A * | 7/1990 | Swinderman | B65G 45/12 15/256.5 |
| 5,456,067 | A | 10/1995 | Marler | |
| 5,551,912 | A | 9/1996 | Takemoto et al. | |
| 5,875,881 | A * | 3/1999 | Brink | B65G 45/16 198/497 |
| 6,349,812 | B1 * | 2/2002 | Epp | B65G 41/002 198/813 |
| 6,371,280 | B1 | 4/2002 | Lindner | |
| 7,073,661 | B2 * | 7/2006 | Wilmo | B65G 15/42 198/841 |
| 7,584,835 | B2 * | 9/2009 | Wimsatt | B08B 1/02 198/496 |
| 7,690,499 | B2 | 4/2010 | Smith et al. | |
| 8,006,830 | B2 | 8/2011 | Swinderman | |
| 8,061,511 | B2 * | 11/2011 | Eberle | B65G 15/64 198/837 |
| 8,365,899 | B2 | 2/2013 | McKee | |
| 8,464,858 | B2 * | 6/2013 | Kirschner | B65G 45/16 198/499 |
| 9,016,462 | B2 * | 4/2015 | Fries | B65G 45/16 198/497 |
| 9,463,930 | B2 | 10/2016 | Minkin | |
| 9,637,322 | B1 * | 5/2017 | Tratch | B65G 15/60 |
| 10,407,248 | B2 * | 9/2019 | Rempel | B65G 23/44 |
| 10,477,769 | B2 * | 11/2019 | Johnson | A01D 57/20 |
| 11,147,212 | B2 | 10/2021 | Batu et al. | |
| 2022/0306390 | A1 | 9/2022 | Haugen et al. | |

* cited by examiner

BELT CONVEYOR CAPABLE OF CONVEYING OILSEED PRODUCTS

CROSS-REFERENCE TO RELATED APPLICATION

This application claims priority to and benefit of U.S. patent application Ser. No. 16/838,065, filed Apr. 2, 2020, which claims priority to and benefit of CA Serial No. 3,046,751, filed Jun. 17, 2019, the contents of which are incorporated by reference in their entirety for all purposes.

FIELD OF THE INVENTION

The present invention relates to the field of conveying equipment and more particularly a belt conveyor for transporting particulate material and especially oilseeds up the conveyor.

BACKGROUND

Typically, belt conveyors for particulate material, such as grain, oilseeds, fertilizer, and other agricultural products use a belt to carry the particulate material up a tubular body of the belt conveyor to be discharged out an upper discharge end of the belt conveyor. These belt conveyors will typically comprise an upper run in the body of the belt conveyor that the belt passes through as it travels up the belt conveyor carrying the particulate material with this upper run being shaped in a troughed configuration to carry the particulate material in the center of the belt. The belt conveyor is mounted on a frame that commonly contains ground wheels to allow the belt conveyor to be moved around on a ground surface and that supports the body of the belt conveyor in an inclined orientation. The belt travels up the body of the belt conveyor carrying the particulate material until the belt passes over a top roller at the discharge end of the belt conveyor, discharging any particulate material being carried on the belt off of the belt and out the discharge end of the belt conveyor. When the belt passes over this top roller, the belt travels back down the body of the belt conveyor in a return run passing under the upper run that the belt takes traveling up the belt conveyor.

The return run of the belt typically passes through a s-drive section mounted under the body of the belt conveyor. The s-drive section contains a number of rollers, including idling rollers, a tensioning roller and a drive roller that keeps the belt under tension and drives the belt through its path in the belt conveyor.

From the s-drive section, the belt will typically run back to an intake end of the belt conveyor where a hopper is provided. After the belt runs through the hopper, the belt travels back of up the upper run in the body of the belt conveyor carrying any particulate material that was deposited on the belt in the hopper. This particulate material will be discharged out the discharge end of the belt conveyor when the portion of the belt carrying this material reaches the discharged end of the belt conveyor.

Problems can arise when conveying small particulate material, such as grains, and especially when this particulate material is made up of oily particles, such as oilseeds like canola or flax. These small and/or oily seeds can move off the edges of the belt and fall into the interior of the belt conveyor, where they can cause a buildup of material on the back of belts, rollers, or other places within the belt conveyor and foul the different components in the belt conveyor. These seeds that fall off the belt can also be crushed, which is especially problematic with oilseeds since crushing the oilseeds will cause the oilseeds to release oil. This oil from these crushed oilseeds can negatively impact the performance of the belt conveyor with the oil causing the crushed oilseeds to become very gummy and sticky, impeding the operation of the rollers, building up on the belts and other components, causing the belt to slip on the drive or other rollers or otherwise fouling the components and the operation of the belt conveyor. The oil released from the crushed oil seeds can also cause the material the belt is made of to deteriorate and even fail, in some cases.

BRIEF SUMMARY

In a first aspect, a belt conveyor is provided. The belt conveyor can include an intake end, a discharge end, a body extending between the intake end and the discharge end, a frame having ground wheels and positioning the body in an inclined orientation, a hopper provided at an intake end, the hopper having an upper end and a lower end, a transition section having a first side wall and a second side wall and positioned between the hopper and the body, an s-roller assembly having a top s-roller and a bottom s-roller and positioned at the upper end of the hopper, and a belt having a first edge and a second edge. The belt travels along a travel path in the belt conveyor; the belt traveling through an upper run in the hopper, over the top s-roller, under the bottom s-roller, through the transition section, up an upper run in the body to the discharge end and down a return run in the body, through a lower run in the hopper and back to the upper run in the hopper.

In a further aspect, the belt conveyor can include a first transition belt edge seal having an upper end, a lower end and a flat body extending from the upper end towards the lower end and a second transition belt edge seal having an upper end, a lower end and a flat body extending from the upper end towards the lower end. The first transition belt edge seal can extend from the upper end of the hopper along the first side wall of the transition section and the second transition belt edge seal can extend from the upper end of the hopper along the second side wall of the transition section.

In a further aspect, the belt conveyor can include a deflector having a first end positioned adjacent the top s-roller and extending towards the belt in the transition section.

In a further aspect, the belt conveyor can include a scraper positioned in contact with a roller in the belt conveyor and extending substantially the width of the roller.

In a further aspect, the belt conveyor can include a wiper positioned in contact with a bottom surface of the belt and extending substantially the width of the bottom surface of the belt.

In a further aspect, the belt conveyor can include a collection tray provided in an s-drive section of the belt conveyor.

In a further aspect, the belt of the belt conveyor can include edges, a top surface having pairs of adjacent ridges provided on the top surface, each ridge having a pair of arms extending from a point, in a travel direction of the belt, wherein each pair of adjacent ridges define a v-channel on the top surface of the belt; and a bottom surface.

In another aspect, a belt for a belt conveyor is provided. The belt can include edges, a top surface having pairs of adjacent ridges provided on the top surface, each ridge having a pair of arms extending from a point, in a travel direction of the belt, wherein each pair of adjacent ridges define a v-channel on the top surface of the belt, and a bottom surface.

BRIEF DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
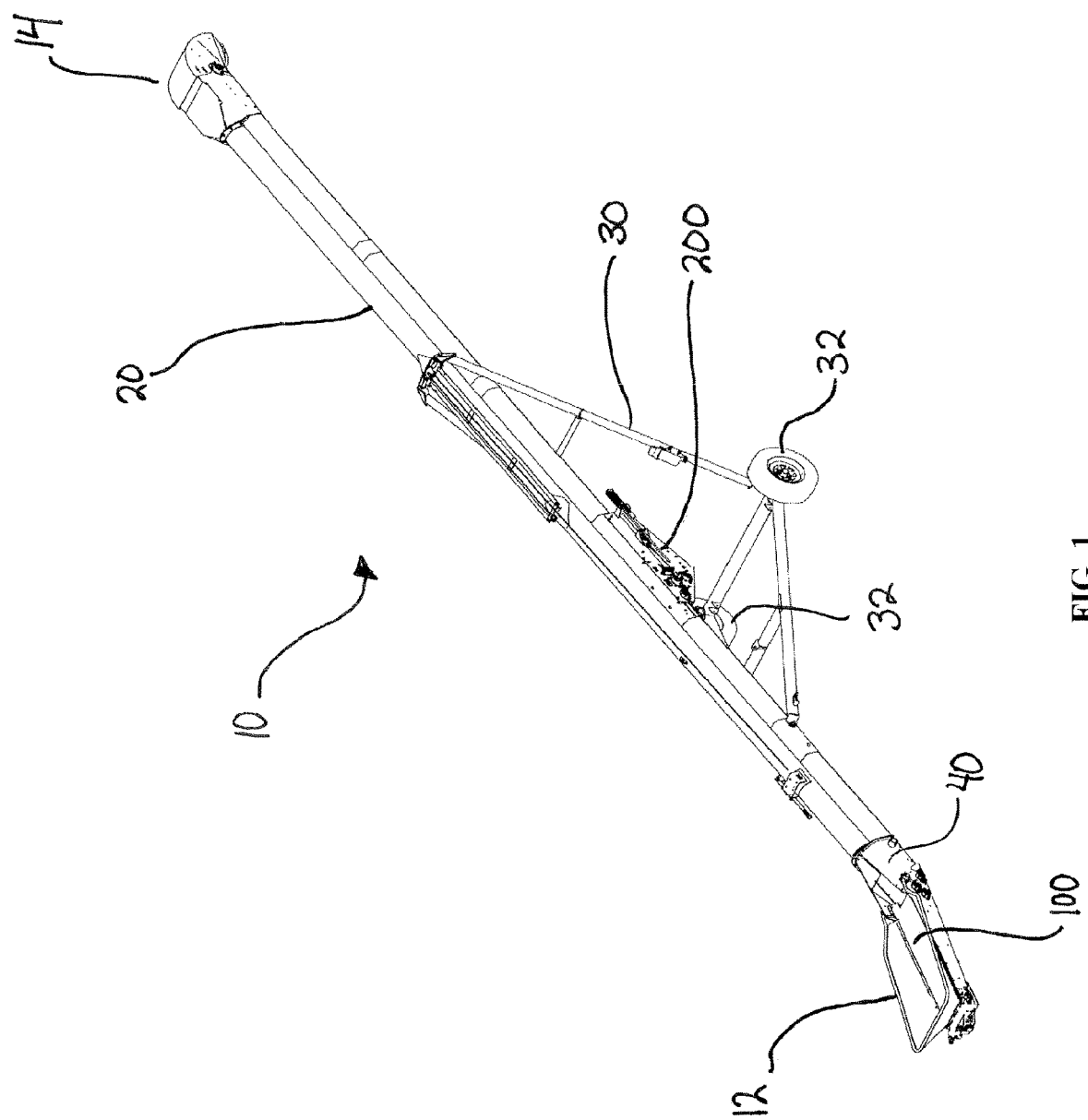
FIG. 1 is a perspective view of a belt conveyor.
Figure 2:
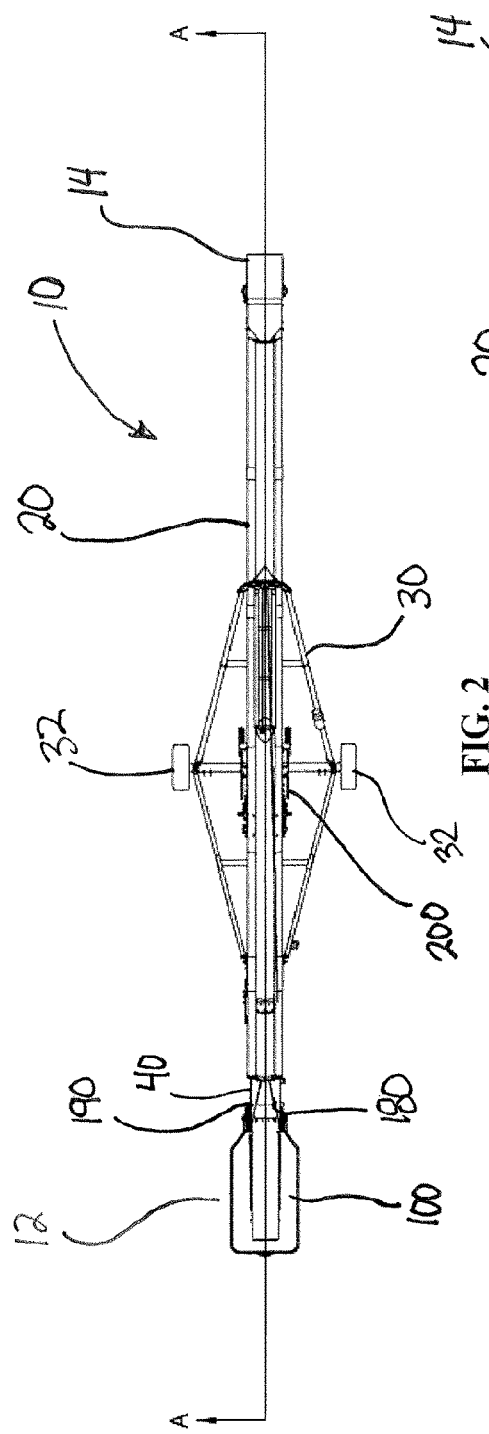
FIG. 2 is a top view of the belt conveyor shown in FIG. 1.
Figure 3:
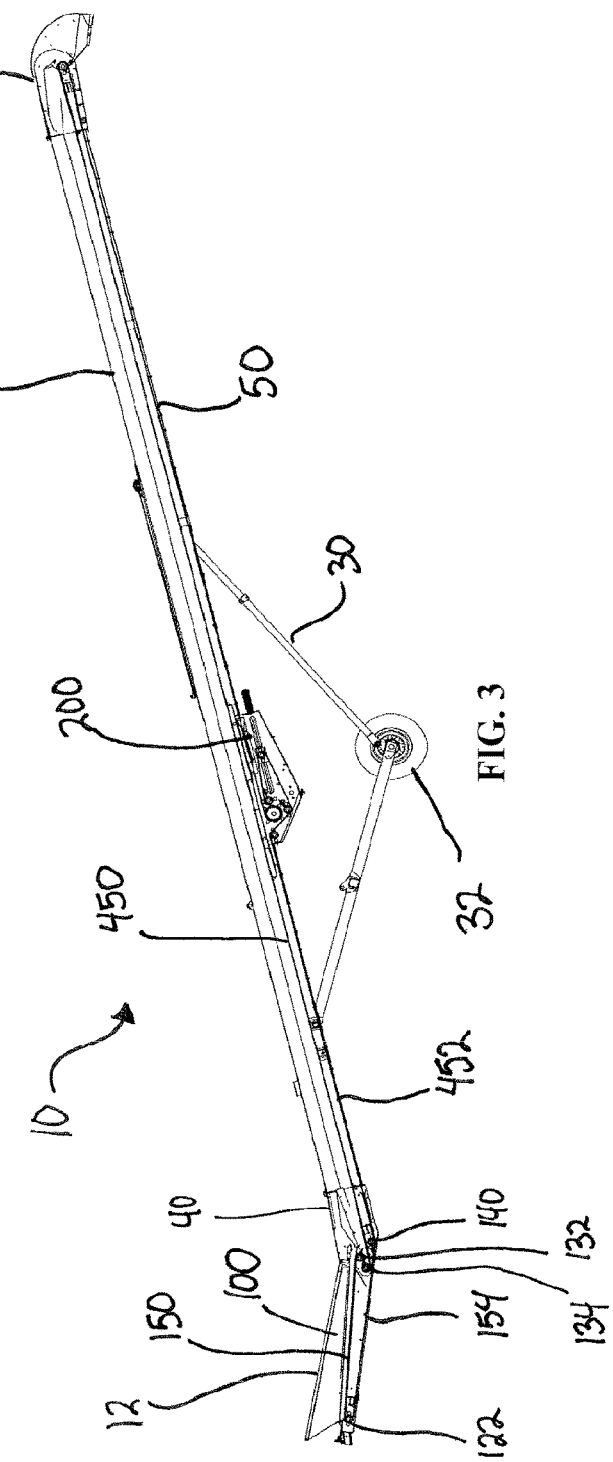
FIG. 3 is a side sectional view of the belt conveyor along sectional line AA shown in FIG. 2.

FIGS. 1-3 illustrate a belt conveyor 10 for conveying particulate material, such as grain, oilseeds, fertilizer, and other products, up the belt conveyor 10 from an intake end 12, where the particulate material is loaded into the belt conveyor 10, to a discharge end 14, where the particulate material is discharged out of the belt conveyor 10 and into a trailer, storage bin, etc. A generally tubular body 20 can extend at an inclined orientation from the intake end 12 of the belt conveyor 10 to the discharge end 14 of the belt conveyor 10.

The belt conveyor 10 can have a frame 30 supported on ground wheels 32 so that the belt conveyor 10 can be moved along a ground surface while the frame 30 positions the body 20 of the belt conveyor 10 in the inclined orientation.

The intake end 12 of the belt conveyor 10 can have a hopper 100 that extends along a ground surface to a transition section 40 positioned between the hopper 100 and the body 20 of the belt conveyor 10. The shape of the hopper 100 can reach under a bottom discharge of a trailer or bin to receive particulate material, discharged out of a bottom discharge of the trailer or bin, so that the belt conveyor 10 can move the particulate material received in the hopper 100 up the belt conveyor 10 to be discharged out the discharge end 14.

The discharge end 14 of the belt conveyor 10 can have a spout to direct the flow of particulate material being discharged out of the discharge end 14 of the belt conveyor 10 into another trailer, storage bin, etc.

A belt 50 can travel along a travel path in the belt conveyor 10, running through the hopper 100, a transition section 40 and the body 20 of the belt conveyor 10 to convey particulate material that has been introduced into the hopper 100 at the intake end 12 of the belt conveyor 10 up the body 20 to the discharge end 14 of the belt conveyor 10 where the particulate material will be discharged from the belt conveyor 10.

An s-drive section 200 can be provided in proximity the body 20 of the belt conveyor 10 and the belt 50 can be routed through this s-drive section 200. The s-drive section 200 can contain components to drive the belt 50 through its path in the belt conveyor 10 and to keep the proper tension and alignment on the belt 50 as it travels through the belt conveyor 10.

The belt conveyor 10 can be configured to convey particulate material and especially oilseeds, such as canola, flax, hemp, sunflower, etc., up the belt conveyor 10 while minimizing damage to the components of the belt conveyor 10 and any negative effects to the oilseeds or other particulate material being conveyed up the belt conveyor 10. Many oilseeds are small in size and are easily leaked in conventional conveyors. This leaked oilseed can enter portions of the conveyor, such as the drivetrain, pulleys, rollers, etc. of the conveyor, where it can get crushed and oil released from the crushed oilseed can be exposed to the fabric of the belt, roller elements and other components of the conveyor. This oil and crushed oilseeds can build up and affect the performance of the conveyor in many ways, (i.e. belt tracking, belt clearances, roller slippage, etc.). The oil can also cause damage to the belt itself by degrading the material the belt is made from. The belt conveyor 10 has a number of features and elements to reduce and even prevent these problems with conveying oilseeds and other particulate material using the belt conveyor 10.

Figure 4:
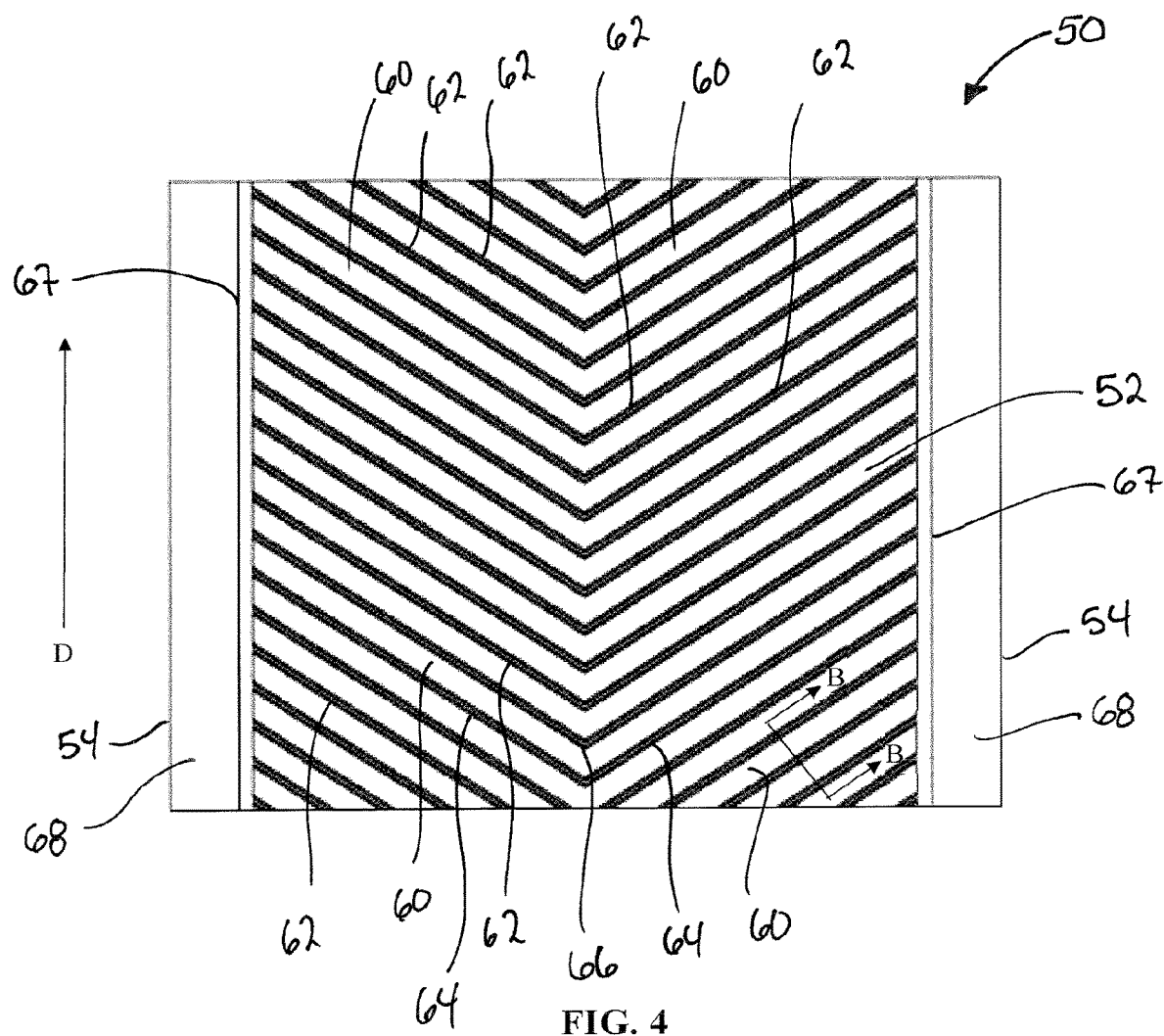
FIG. 4 is a top view of a belt for use in the belt conveyor.
Figure 5:
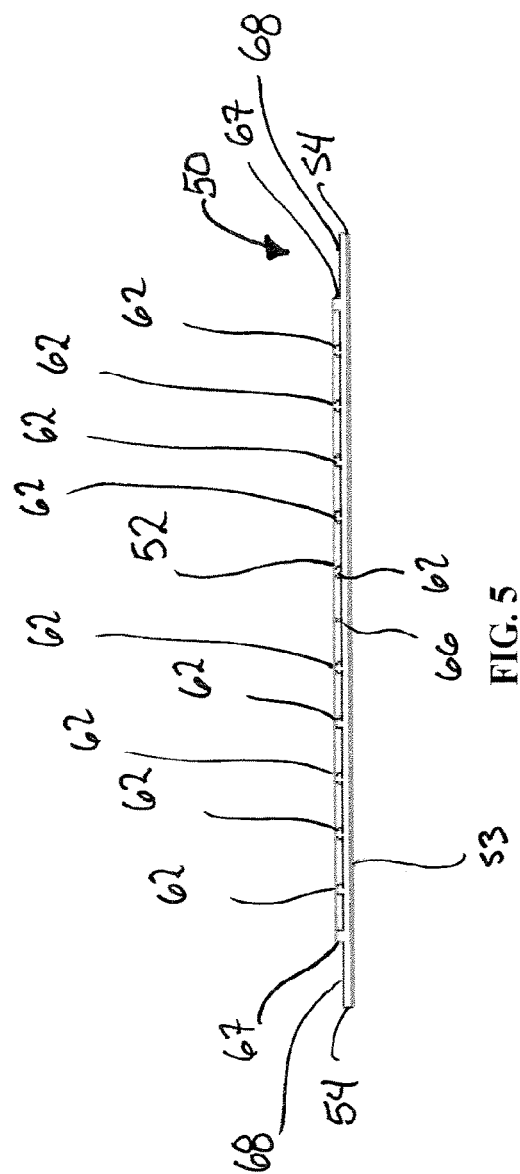
FIG. 5 is a side sectional view of the belt shown in FIG. 4.
Figure 6:
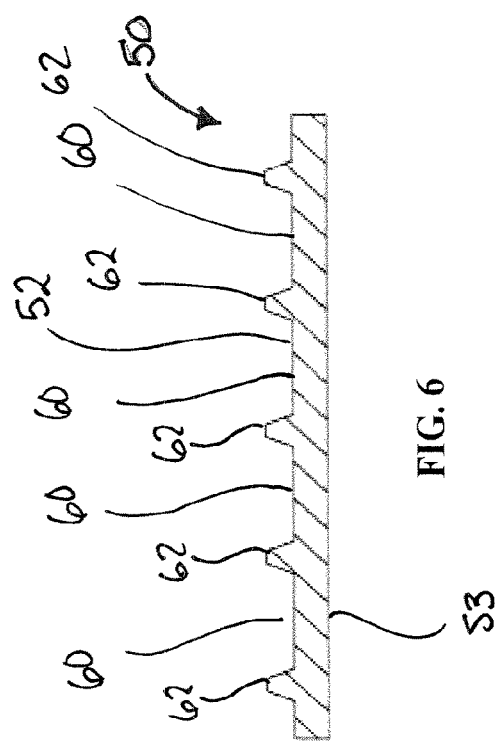
FIG. 6 is a close up sectional view along sectional line B-B in FIG. 4.

Referring to FIGS. 4-6, illustrates a portion of the belt 50. While FIGS. 4-6 show a short portion of the belt 50, the length of the belt 50 can be made as long as needed to run through the path in the belt conveyor 10. The top surface 52 of the belt 50 can have a profile that is configured to convey the particulate material up the belt conveyor 50 while trying to motivate the particulate material to move towards a center of the belt 50 away from the edges 54 of the belt 50. The top surface 52 can have a series of v-channels 60, each v-channel 60 defined by a pair of adjacent raised ridges 62. The ridges 62 can each have a pair of arms 64 extending from a point 66, with the arms 64 oriented so that when the belt 50 is moving in the travel direction, D, the arms 64 of the ridges 62 are placed in front of the point 66 and the point 66 trails the arms 64 of the ridges 62.

In one aspect, the v-channels 60 can be positioned so that the point 66 formed by the arms 64 of the ridges 62 is in substantially a center of the belt 50. In another aspect, the arms 64 of each ridge 62 can extend from the point 66 of the ridge 62 at an angle of 35° from an axis perpendicular to the direction of travel, D. In another aspect, the arms 64 of each ridge can extend from the point at an angle between 25° and 45°. In a further aspect, the arms 64 of each ridge can extend from the point at an angle between 15° and 55°.

The v-channels 60 can be used to direct particulate material, such as oilseeds, being carried up the belt conveyor 10 on the belt 50 towards a center of the belt 50 to try and cause the oilseeds to remain in the center of the belt 50, rather than moving to the edges 54 of the belt 50 due to the movement of the belt 50 as the belt 50 travels along the travel path, in the travel direction, D, in the belt conveyor 10. This will prevent the oilseeds being carried on the top surface 52 of the belt 50 from moving towards and off the edges 54 of the belt 50 where the oilseeds can be leaked and/or crushing cause damage to components of the belt conveyor 10 or otherwise affecting the performance of the belt conveyor 10.

A set of side ridges 67 can be positioned at the ends of the arms 64 and oriented parallel to the direction of travel, D, of the belt 50 to enclose the v-channels 60 and prevent particulate material that may move outwards on the belt 50 towards the ends of the v-channels 60 from moving out of the v-channels 60 and reaching the edges 54 of the belt 50. Each side ridge 67 can be positioned adjacent one of the edges 54 and between the one of the edges 54 and the v-channels 60.

Sealing sections 68 adjacent to the edges 54 of the belt 50 can be provided to correspond with sealing elements to prevent particulate material from reaching the edges 54 of the belt 50. Each sealing section 68 can extend between one of the edges 54 of the belt 50 and the side ridge 67 nearest that one of the edges 54.

In one aspect, the belt 50 can be made from an oil-resistant rubber that will not detrimentally degrade (swell) in the presence of oilseeds, extracted oil or oilseed components.

Figure 7:
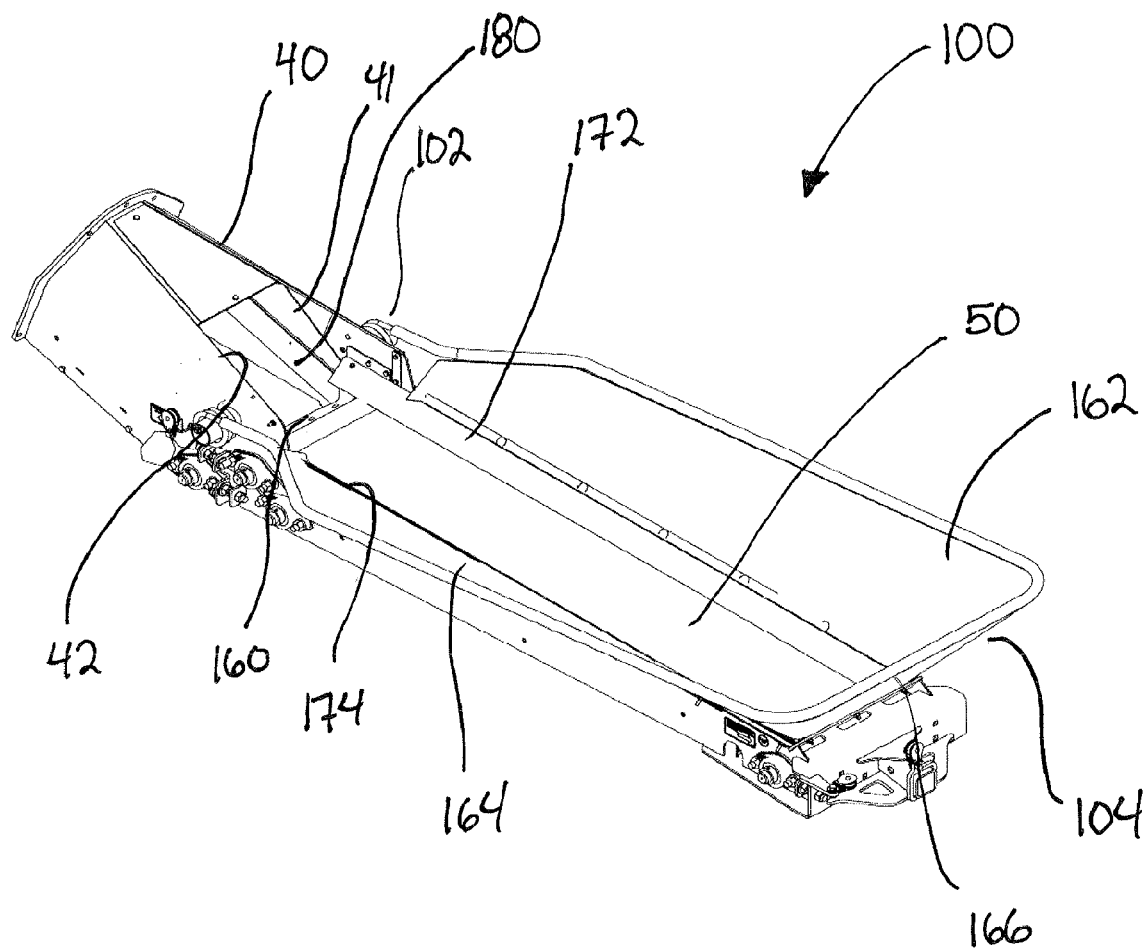
FIG. 7 is a top perspective view of a hopper of the belt conveyor of FIG. 1.
Figure 8:
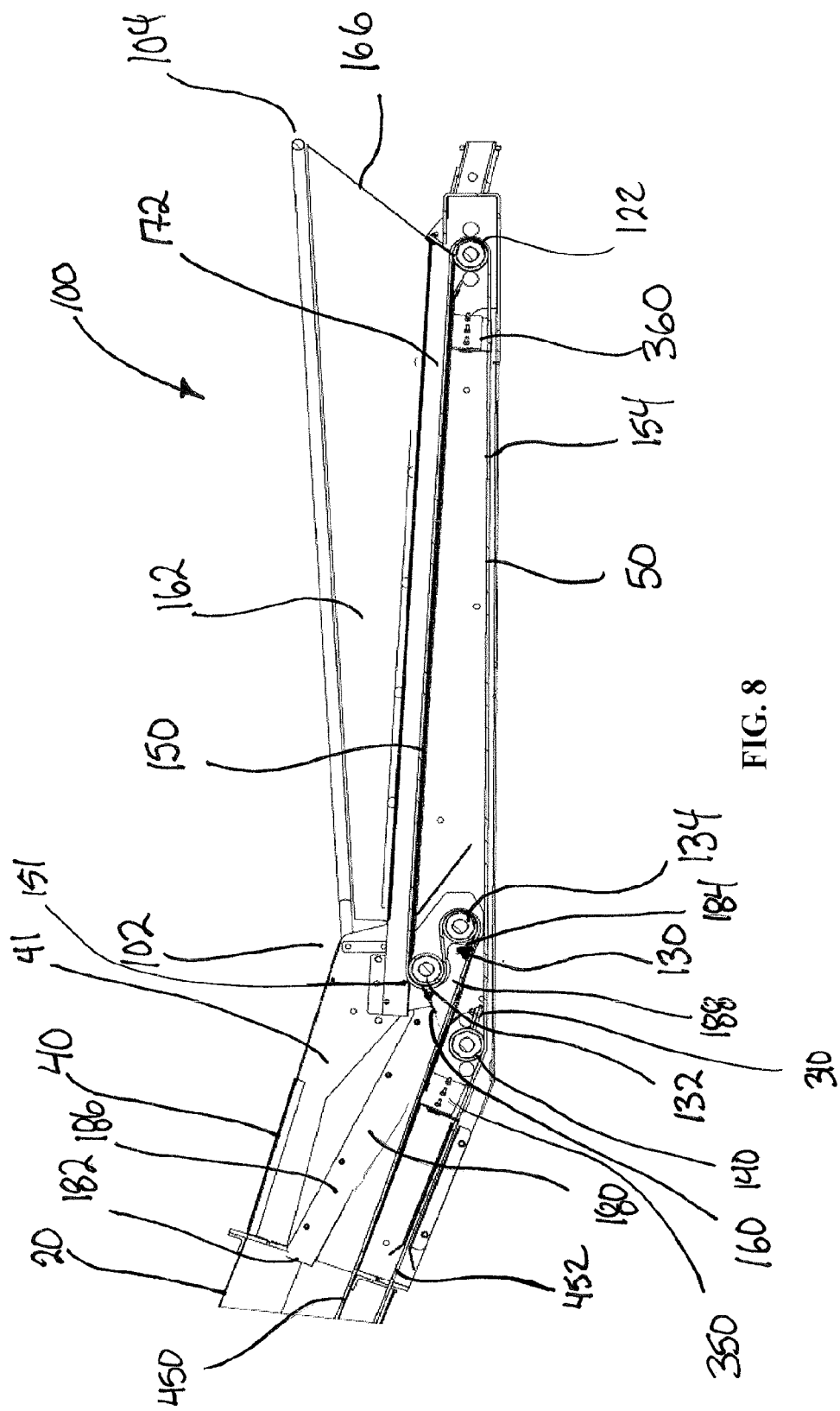
FIG. 8 is a side section view of the hopper of FIG. 7.

FIGS. 7 and 8 illustrate the hopper 100 at the intake end 12 of the belt conveyor 10, the belt 50 can have an upper run 150 passing generally horizontally in the hopper 100 from a lower end 104 to an upper end 102 of the hopper 100 where the belt 50 will pass over a top S-roller 132 of an s-roller assembly 130, and then under a bottom s-roller 134 of the s-roller assembly 130. After passing round the bottom s-roller 134, the belt 50 will then pass through the transition section 40 and subsequently pass up the body 20 of the belt conveyor 10.

The transition section 40 can be provided between the hopper 100 and the body 20 of the belt conveyor 10 where particulate material that is discharged off of the upper run 150 of the belt 50 at the an upper end 102 of the hopper 100 and drops onto the belt 50 as it passes up the body 20 of the belt conveyor 10. The transition section 40 provides a transition from where the belt 50 travels from the hopper 100 to the body 20 of the belt conveyor 10 to direct the particulate material from the upper run 150 onto the incline portion of the belt conveyor 10. The transition section 40 both changes the orientation of the travel path of the belt 50 as it transitions from the upper run 150 in the hopper 100 to the upper run 450 in the body 20 of the belt conveyor 10, but it also changes the shape of the belt 50 from being substantially flat and oriented within a plane in the hopper 100, to a curved, troughed shape where the center of the belt 50 is positioned below the edges 54 of the belt 50 at the lowest points and the belt 50 is curved upwards toward the edges 54 of the belt 50. This troughed configuration of the belt 50 in the body 20 of the belt conveyor 10 motivates the particulate material being carried up the belt conveyor 10 by the belt 50 towards the lowest place in the trough, the center of the belt 50, rather than towards the higher edges 54.

The transition section 40 can have a first sidewall 41 and a second sidewall 42 that extend between the hopper 100 and the body 20 of the belt conveyor 10.

When the belt 50 returns through a return run, passing below the upper run 450 and along the bottom of the body 20 of the belt conveyor 10, the belt 50 can pass under a back roller 140 and through a lower run 154 along a bottom of the hopper 100 to a front roller 122 positioned in the lower end 104 of the hopper 100 where the belt 50 will pass over the front roller 122 to once again be redirected through the upper run 150 in the hopper 100 and then subsequently up the upper run 450 in the body of the belt conveyor 10.

A first sidewall 162 and a second sidewall 164 extend from the lower end 104 of the hopper 100 along the sides of the hopper 100 to the upper end 102 of the hopper 100. A front sidewall 166 can extend between the first sidewall 162 and the second sidewall 164 at the lower end 104 of the hopper 100.

A resilient first top seal strip 172 can extend from the lower end 104 of the hopper 100 to an upper end 102 of the hopper 100 and over top of the belt 50 where it passes over the top s-roller 132. The first top seal strip 172 can be positioned abutted against the first side wall 162 of the hopper 100 and extending over the sealing section 68 of the belt 50 so that a bottom of the first top seal strip 172 is positioned against the belt 50. In one aspect, the first top seal strip 172 can extend over the sealing section 68 on the belt 50 to the side ridge 67 running between the sealing section 68 and the v-channels 60 so that a bottom of the first top seal strip 172 presses against the top of the side ridge 67.

A resilient second top seal strip 174 can extend from the lower end 104 of the hopper 100 to the upper end 102 of the hopper 100 and over top of the belt 50 where it passes over the top s-roller 132. The second top seal strip 174 can be positioned abutted against the second side wall 164 of the hopper 100 and extending over the sealing sections 168 of the belt 50 so that a bottom of the second top seal strip 174 is positioned against the belt 50. In one aspect, the second top seal strip 174 can extend over the sealing section 68 on the belt 50 to the side ridge 67 so that a bottom of the second top seal strip 174 presses against the side ridge 67.

The first and second top seal strips 172, 174 can be used to protect the edges 54 of the belt 50 and to try and reduce, or even prevent, oilseeds or other particulate material being discharged into the hopper 100 on the upper run 150 of the belt 50 in the hopper 100 from falling off of the belt 50 and into the bottom of the hopper 100.

A pair of transition belt edge seals 180, 190 can be provided in the transition section 40 where particulate material passes from the upper run 150 of the belt 50 at the upper end 102 of the hopper 100 to the transition section 40 where the belt 50 begins to travel up the body 20 of the belt conveyor 10 through the upper run 450. This pair of transition belt edge seals 180, 190 can be used to try reduce, or even prevent, oilseeds or other particulate material from moving past the edges 54 of the belt 50 and falling below the belt 50 in this transition section 40 where the oilseeds, or other particulate material, are changing direction of travel to being travelling up the upper run 450 through the body 20 of the belt conveyor 10.

Figure 9:
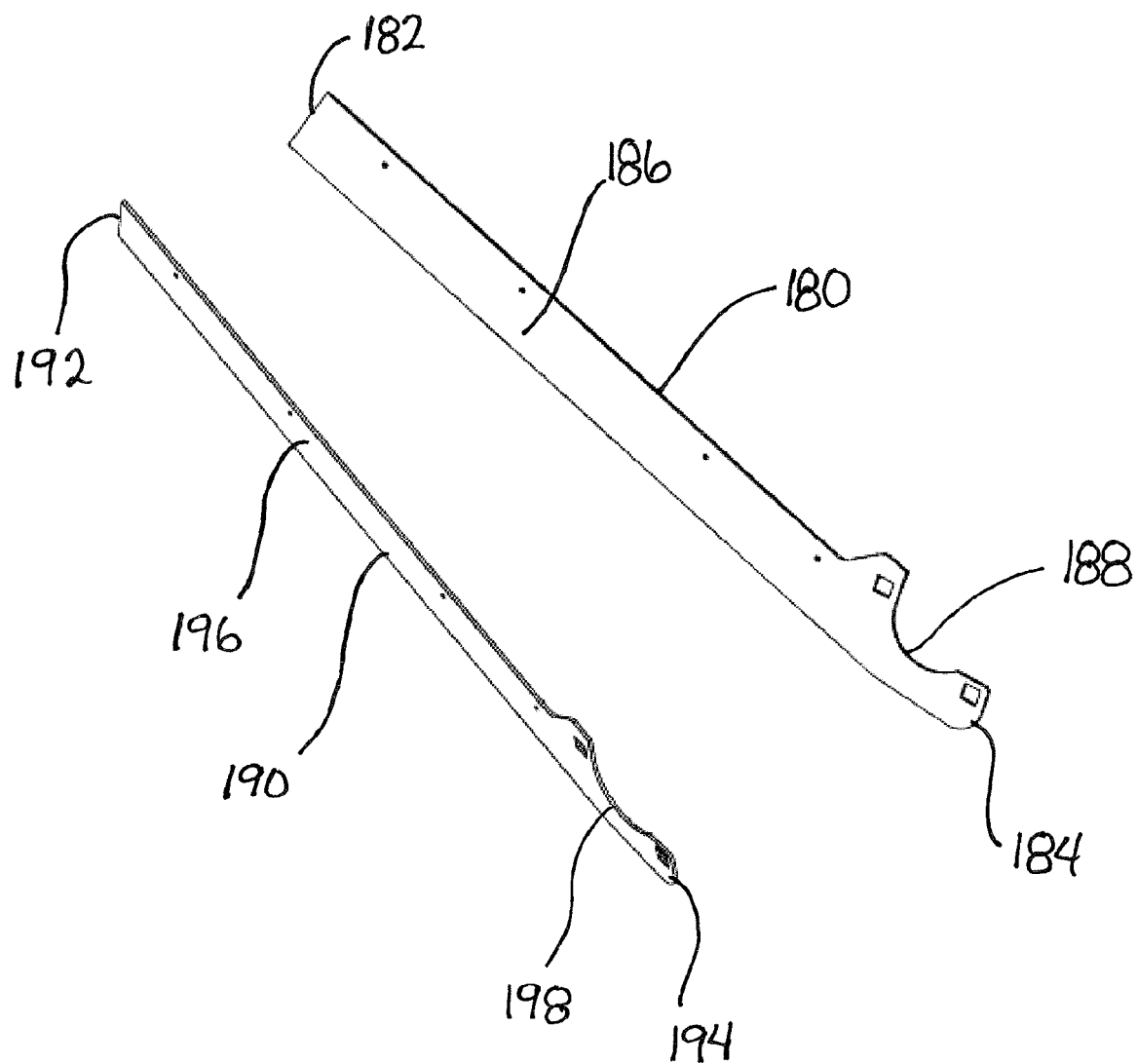
FIG. 9 is a perspective view of a pair of belt edge seals.

FIG. 9 illustrates the pair of resilient transition belt edge seals 180, 190. The first transition belt edge seal 180 can have an upper end 182, a lower end 184 and a flat body 186 extending from the upper end 182 towards the lower end 184. The lower end 184 can have a semi-circular member 188 that has a shape that corresponds to the top s-roller 132. The second transition belt edge seal 190 can have an upper end 192, a lower end 194 and a flat body 196 extending from the upper end 192 towards the lower end 194. The lower end 194 can have a semi-circular member 198 that has a shape that corresponds to the top s-roller 132.

Referring again to FIGS. 7 and 8, the first transition belt edge seal 180 can extend from the upper end 102 of the hopper 100, along the first sidewall 41 of the transition section 40 towards the body 20 of the hopper 100. The first transition belt edge seal 180 can be positioned below and extending under the upper end 102 of the hopper 100 where the lower end 184 of the first transition belt edge seal 180 extends below the upper end 151 of the upper run 150 of the belt 150 through the hopper 100 with the semi-circular member 188 of the first transition belt edge seal 180 positioned below the top s-roller 132 and the lower end 184 extending under the top s-roller 132 so that the lower end 184 of the first transition belt edge seal 180 can be positioned adjacent to the lower s-roller 134. The first transition belt edge 180 can extend from the lower end 184 of the first transition belt edge 180 positioned under the top s-roller 132 and extend up the transition section 40 of the belt conveyor 10 to the upper end 182 of the first transition belt edge seal 180 to the body 20 of the belt conveyor 10. The first transition belt edge seal 180 can be positioned adjacent the first side wall 41 of the transition section 40 of the belt conveyor 10 and extending over the sealing sections 68 of the belt 50 positioned adjacent to the first side wall 41 so that a bottom surface of the first transition belt edge seal 180 is positioned against the belt 50. In one aspect, the first transition belt edge seal 180 can extend over the sealing sections 68 on the belt 50 to the side ridge 67 defining the end of the sealing section 68 so that a bottom of the first transition belt edge seal 180 presses against the side ridge 67.

The second transition belt edge seal 190 can extend from the upper end 102 of the hopper 100, along the second sidewall 42 of the transition section 40 towards the body 20 of the hopper 100. The second transition belt edge seal 190 can be positioned below and extending under the upper end 102 of the hopper 100 where the lower end 194 of the second transition belt edge seal 190 extends below the upper end 151 of the upper run 150 of the belt 50 through the hopper 100 with the semi-circular member 198 positioned below the top s-roller 132 and the lower end 194 extending under the top s-roller 132 so that the lower end 184 of the second transition belt edge seal 190 can be positioned adjacent to the lower s-roller 134. The second transition belt edge seal 190 can extend from the lower end 194 of the second transition belt edge 190 positioned under the top s-roller 132 and extend up the transition section 40 of the belt conveyor 100 to the body 20 of the belt conveyor 10. The second transition belt edge seal 190 can be positioned adjacent the second side wall 42 of the transition section 40 and extending over the sealing section 68 of the belt 50 positioned adjacent to the second side wall 42 so that a bottom surface of the second transition belt edge seal 190 is positioned against the belt 50. In one aspect, the second transition belt edge seal 190 can extend over the sealing sections 68 on the belt 50 to the side ridge 67 defining the end of the sealing section 68 so that a bottom of the second transition belt edge seal 190 presses against the side ridge 67.

In the transition section 40, particulate material is more likely to move off the edges 54 of the belt 50 than when the particulate material is being carried up the belt 50 through the body 20 of the belt conveyor 10. During operation, particulate material is propelled off of the upper end 151 of the upper run 150 of the belt 50 in the hopper 100. This upper run 150 extends generally horizontally in the hopper 100 and extends over the top s-roller 132 so the particulate material discharged off of the upper run 150 will typically be travelling initially in a generally horizontal direction as well. This particulate material will drop onto the belt 50 in the transition section 40 and the belt 50 will be positioned at an incline in the transition section 40 to generally match the incline of the body 20 of the belt conveyor 10 because the transition section 40 is used to transition the path of the belt 50 and the particulate material being carried on the belt 50 into the body 20 of the belt conveyor 10. The motion of the particulate material as it hits the inclined belt 50 in the transition section 40 and the force of the impact of the particulate material on the belt 50 can cause the particulate material to bounce and move about the top surface 52 of the belt 50, increasing the chance that some of this particulate material will moves off the edges 54 of the belt 50. The first and second transition belt edge seals 180, 190 can be used to protect the edges 54 of the belt 50 and to try and reduce or even prevent oilseeds or other particulate material from falling of the edges 54 of the belt 50 after the particulate material impacts the inclined belt 50 in the transition section 40.

Once the belt 50 travels up the belt conveyor 10 from the transition section 40 into the body 20 of the belt conveyor 10, the particulate material on the belt 50 should have settled down after impacting the belt 50 in the transition section 40 and the troughed configuration of the belt 50 as the belt passes through the upper run 450 in the body 50 should make the particulate material much less likely to move off the edges 54 of the belt 50 after the belt 50 has passes through the transition section 40 and entered they body 20 of the belt conveyor 10.

A resilient deflector 160 can also be provided in the transition section 40 of the belt conveyor 10 adjacent the top s-roller 132 to prevent particulate material, that has been discharged off of the upper end 151 of the upper run 150 of the belt 50 in the hopper 100 and into the transition section 40, from moving back down the belt 50 and under the top S-roller 132 to potentially come in contact with the bottom s-roller 134. If particulate material was to move back down the belt 50 and under the top s-roller 132, it can come directly into contact with the bottom s-roller 134. Because of the way the belt 50 is routed over the top s-roller 132 and the bottom s-roller 134, the outer surface of the bottom s-roller 134 can be left exposed to particulate material that falls back down the belt 150 and under the top s-roller 132. Because of the orientation of the top s-roller 132 and the bottom s-roller 134, the belt 50 will not pass between the particulate material and the outer surface of the bottom s-roller 134.

The deflector 160 can have a width that extends across a width of the belt 50 and the deflector 160 can be angled downward and extend from a first end 162 of the deflector 160, immediately adjacent the belt 50 and it passes over the top s-roller 132, to a second end 164 of the deflector 160, positioned towards or adjacent to the belt 50 as the belt 50 travels up the transition section 40. In this manner, the deflector 60 can direct particulate material onto the inclined path of the belt 50 as it travels through the transition section 40 and try and prevent the particulate material from rolling back down the belt 50 and under the top s-roller 132 where the particulate material can come into contact with the bottom s-roller 134, churn and/or get forced off the edges 54 of the belt 50.

The deflector 60 can also remove some material that may adhere to the top surface 52 of the belt 50 immediately after the belt 50 has finished travelling through the upper run 150 in the hopper 100 and before the belt 50 travels under the top s-roller 132 and over the bottom s-roller 134.

Figure 10:
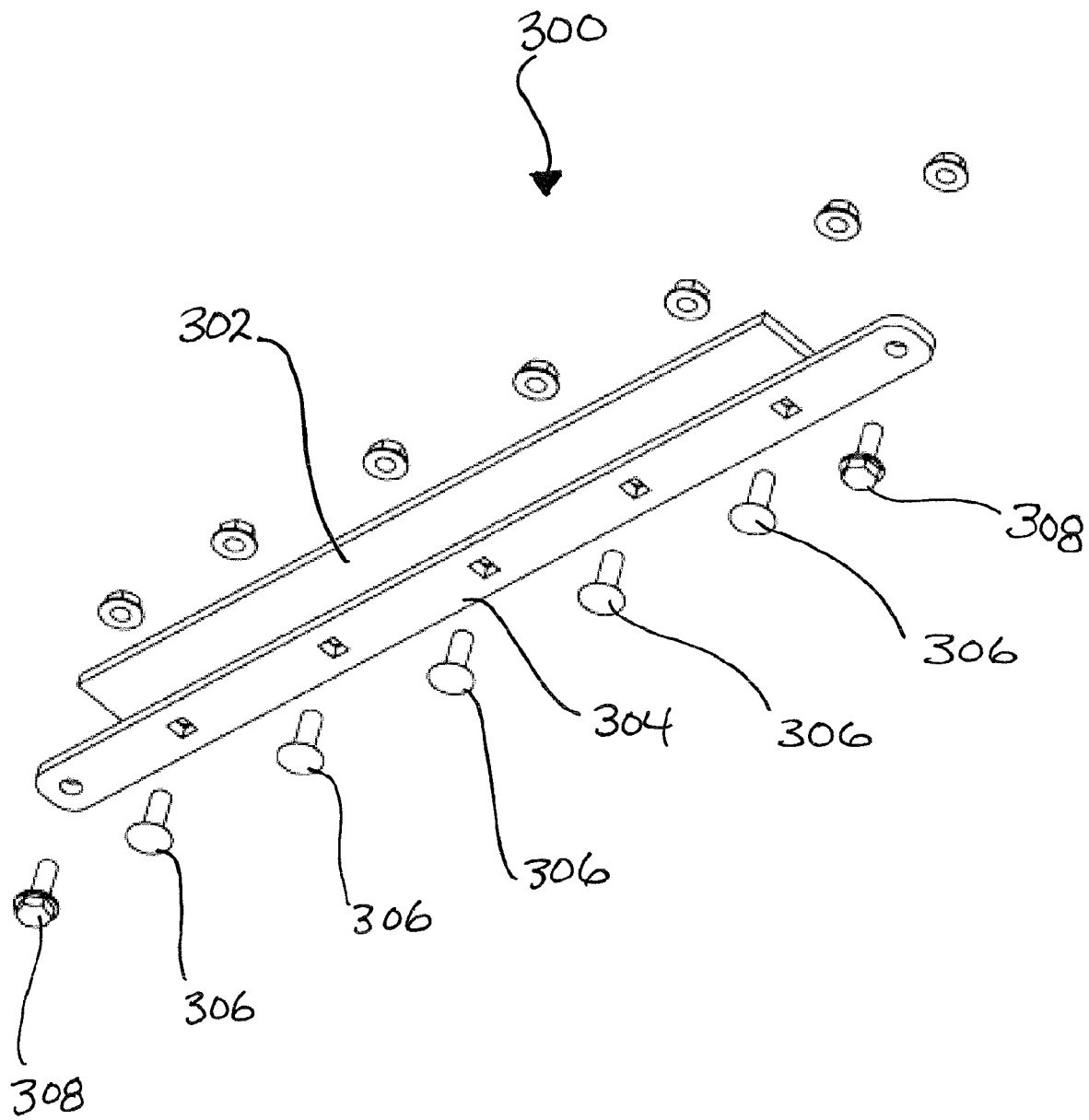
FIG. 10 is a perspective view of a scraper.

FIG. 10 illustrates a scraper 300 the can be used to try and prevent buildup of oilseeds, oil from oilseeds and other materials on rollers in the belt conveyor 10. This scraper 300 can have a mounting flange 304, a scraper member 302, a number of scraper fasteners 306 and a number of mounting fasteners 308. The mounting flange 304 can be used to mount the scraper member 302 in position against a roller in the belt conveyor 10. The scraper fasteners 306 can be used to removably attach the scraper member 302 to the mounting flange 304. The mounting fasteners 308 can be used to fasten the mounting flange 304 and therefore the scraper 300 itself in position against a roller in the belt conveyor 10.

The scraper member 302 can be positioned to be in contact with a smooth outer surface of a roller and extending substantially a width of the roller to remove any material may adhere to the roller. The scraper member 302 can be formed of a low friction rigid material, such as UHMW which has good wear properties, to increase the life of the scraper member 304.

When the scraper member 302 has become worn from the friction between the scraper member 302 and the roller and no longer effective to remove material from the roller (i.e. there is a gap between the scraper member 302 and the outer surface of the roller), the position of the scraper member 302 relative to the mounting flange 304 can be adjusted using the mounting fasteners 308 to move the scraper member 302 up against the outer surface of the roller again. If the scraper member 302 is too worn, the scraper member 302 can even be removed and replaced with a new scraper member 302.

Referring again to FIG. 8, a first scraper 310, which can be a scraper 300, can be positioned adjacent the back roller 140 to contact the smooth outer surface of the back roller 140 and extend along a width of the back roller 140, to remove any material, such as crushed oilseeds, etc. that are attempting to adhere to the outer surface of the back roller 140. The first scraper 310 can be adjustable so that the first scraper 310 can be re-positioned if wear of the first scraper 310 allows excessive build-up, or even removed and replaced if the first scraper 310 is excessively worn.

Figure 11:
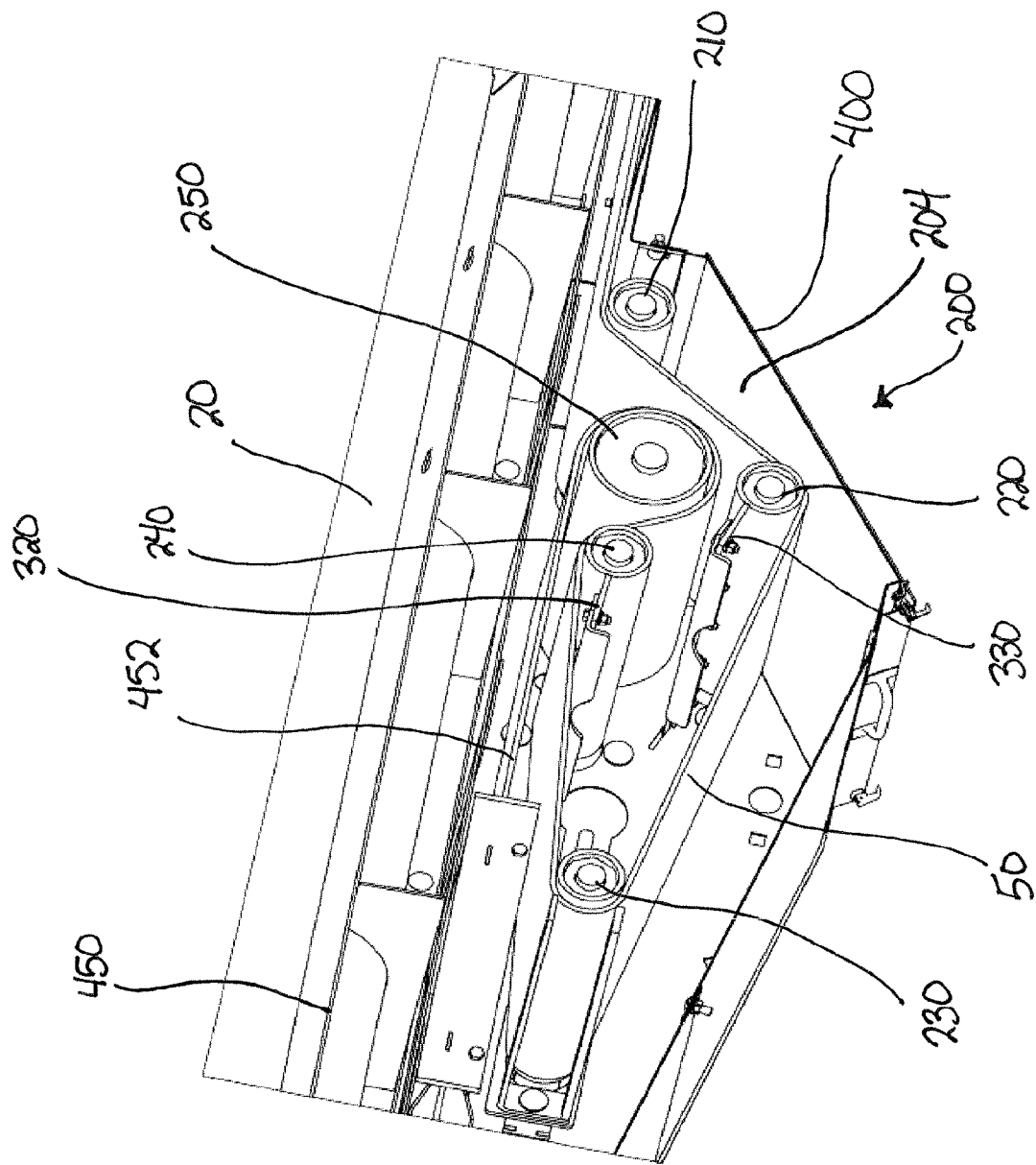
FIG. 11 is a side sectional view of an s-drive of a belt conveyor.

Referring again to FIG. 1, the scrapers can be provided in the s-drive 200. FIG. 11 illustrates a section view of the interior of the s-drive 200. As the belt 50 returns travelling down the return run 452, beneath the upper run 450, in the body 20 of the belt conveyor 10, the belt 50 can enter the s-drive 200 where the belt 50 will pass over top of and around a drive roller 250. The drive roller 250 is driven by a motor (not shown), such as a hydraulic motor, and the rotation of this drive roller 250 causes the belt 50 to travel through its path in the belt conveyor 10. Once the belt 50 passes around the drive roller 250, the belt 50 can pass over top of a directing roller 240 which will direct the belt over top of and around a tensioning roller 230. The tensioning roller 230 can be moved relative to the s-drive 200 so that the tension placed on the belt 50, by the tensioning roller 230, can be altered as desired. From the tensioning roller 230, the belt can be directed to pass underneath an idle roller 220 before being re-directed back upwards to pass over a re-directing roller 210. After the belt 50 passes over the re-directing roller 210, the path of the belt 50 is once again directed down the body 20 of the belt conveyor 10, along the return path 452, to the intake end 12 of the belt conveyor 10.

A second scraper 320, which can be a scraper 300, can be provided in contact with the directing roller 240 to remove any material that has collected on the outer surface of the directing roller 240 and a third scraper 330, which can be a scraper 300, can be provided in contact with the idle roller 220 to remove any material that has collected on the outer surface of the idle roller 220.

Figure 12:
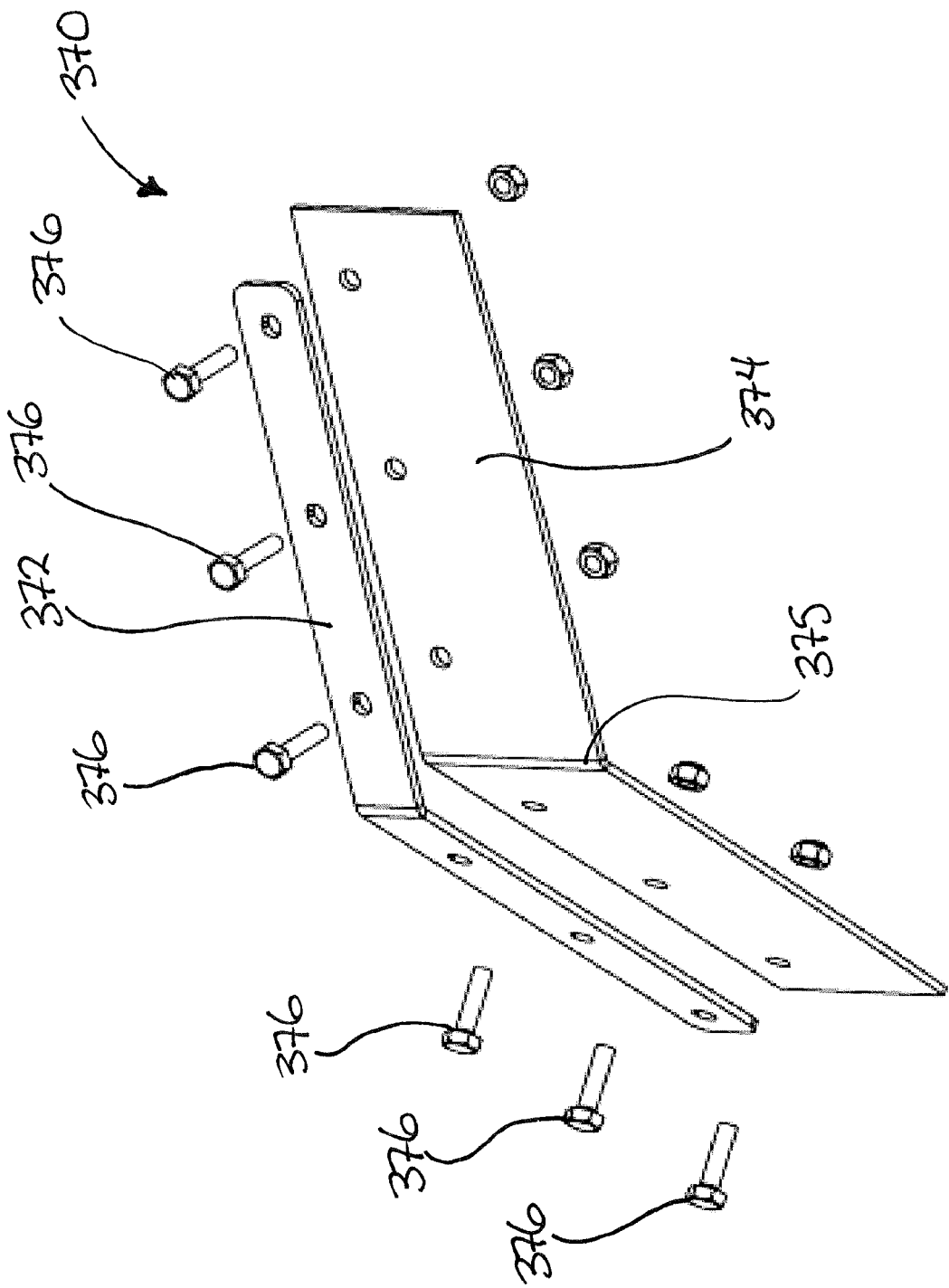
FIG. 12 is a perspective view of a wiper.

FIG. 12 illustrates a wiper 370 that can be used to remove or "wipe" materials that have collected to the bottom surface 53 of the belt 50. The wiper 370 can be positioned in contact with the bottom surface 53 of the belt 50 and extending substantially the width of the bottom surface 53 of the belt 50. The wiper 370 can have a mounting flange 372, a wiper member 374 and a plurality of fasteners 376. The mounting flange 372 can allow the wiper members 374 to be secured in place in the belt conveyor 10 and allow the wiper member 374 to be attached to the mounting flange 372 using the fasteners 376. The mounting flange 372 and the wiper member 374 can be positioned in the belt conveyor 10 such that the wiper member 374 is pressed against the bottom surface 53 of the belt 50. Unlike the top surface 52 of the belt 50, the bottom surface 53 of the belt 50 can be substantially flat surface, without any raised ridges or protrusions, allowing the wiper 370 to wipe material off the bottom surface 53 of the belt 50.

The wiper member 374 can be formed of a flexible material, such as urethane, so that the wiper member 374 can provide a consistent pressure against the bottom surface 53 of the belt 50. In one aspect, the material of the wiper member 374 can be chosen to be durable enough that the wiper member 374 will not wear quickly from friction between the wiper member 374 and the bottom surface 53 of the belt 50. Urethane also has the benefit of not being susceptible to degradation from the oily materials that will be removed from the belt 50.

The wiper 374 can be positioned at an angle to the direction of travel of the belt 50 so that material that comes into contact with the wiper 374 is moved outwards towards the edge 54 of the belt 50 and discharged off the edge 54 of the belt 50 by the wiper 374. In one aspect, the wiper member 374 can have a point 375 from which the sides of the wiper member 374 extend at an angle backwards resulting in the wiper member 374 having an arrow-like profile. When this wiper member 374 is positioned against the bottom surface 53 of the belt 50, material will be moved off the edges 54 of the belt 50 because of the arrow-like profile of the wiper member 374.

Referring again to FIG. 8, wipers 350, 360, which can each be a wiper 370, can be provided to remove or "wipe" any material buildup, such as crushed oilseeds, from the belt 50. The wipers 350, 360 can be provided in the hopper 100 so that the wipers 350, 360 are positioned against the back of the belt 50 in the lower run 154 in the hopper 100. In this manner, the wipers 350, 360 can remove material that has collected on the belt 50 as the belt 50 reaches the end of its return run 452 back down the body 20 of the belt conveyor 10 and through the lower run 152 in the hopper 100 before the belt 50 passes around the front roller 122 in the lower end 104 of the hopper 100 and travels back through the upper run 150 in the hopper 100 and back up the upper run 450 in the body 20 of the belt conveyor 10. Any material that as accumulated on the bottom surface 53 of the belt 50 as the belt 50 has travelled down the return run 452, such as material that falls off the edges 54 of the belt 50 in the upper run 450, can be removed by these wipers 350, 360 before the belt 50 begins travelling back up the belt conveyor 10.

The wipers 350, 360 can be positioned in front of critical rollers in the belt conveyor 10 so that the wiper 350, 360 can remove material that has accumulated on the bottom surface 53 of the belt 50 before the belt 50 reaches these critical rollers in the belt conveyor 10 preventing the material from contacting and building up on these rollers. The first wiper 350 can be positioned in front of the back roller 140 so that the belt 50 must pass by the first wiper 350 before it travels to the back roller 140 so that the wiper 350 can wipe the bottom surface 53 of the belt 50 before the belt 50 passes under the back roller 140 and enters the lower run 152 in the hopper 100 to try and remove any material that has gathered on the bottom surface 53 of the belt 50 as the belt 50 travels down the return run 452 through the body 20 of the belt conveyor 10. If material was not removed by the first wiper 350 before the back roller 140 any material on the bottom surface 53 of the belt 50 could be crushed between back roller 140 and the bottom surface 53 of the belt 50 when the belt 50 travels under and against the outer surface of the back roller 140. This can cause material to build up on the outer surface of the back roller 140 as well as further adhering the material to the bottom surface 53 of the belt 50.

The second wiper 360 can be positioned against the bottom surface 53 of the belt 50 and in front of the front roller 122 so that material that may have accumulated on the bottom surface 53 of the belt 50 in the hopper 100 or may have been removed by the first wiper 350 can be removed from the belt 50 by the second wiper 360 before the belt 50 passes around the front roller 122 and travels through the upper path 150 in the hopper 100 and then through the transition section 40 before the belt 50 travels back up the body 20 of the belt conveyor 10. If material was not removed by the second wiper 360 before the front roller 122 any material on the bottom surface 53 of the belt 50 could be crushed between the front roller 122 and the bottom surface 53 of the belt 50 when the belt 50 travels around and against the front roller 122 before once again travelling up the belt conveyor 10.

Figure 13:
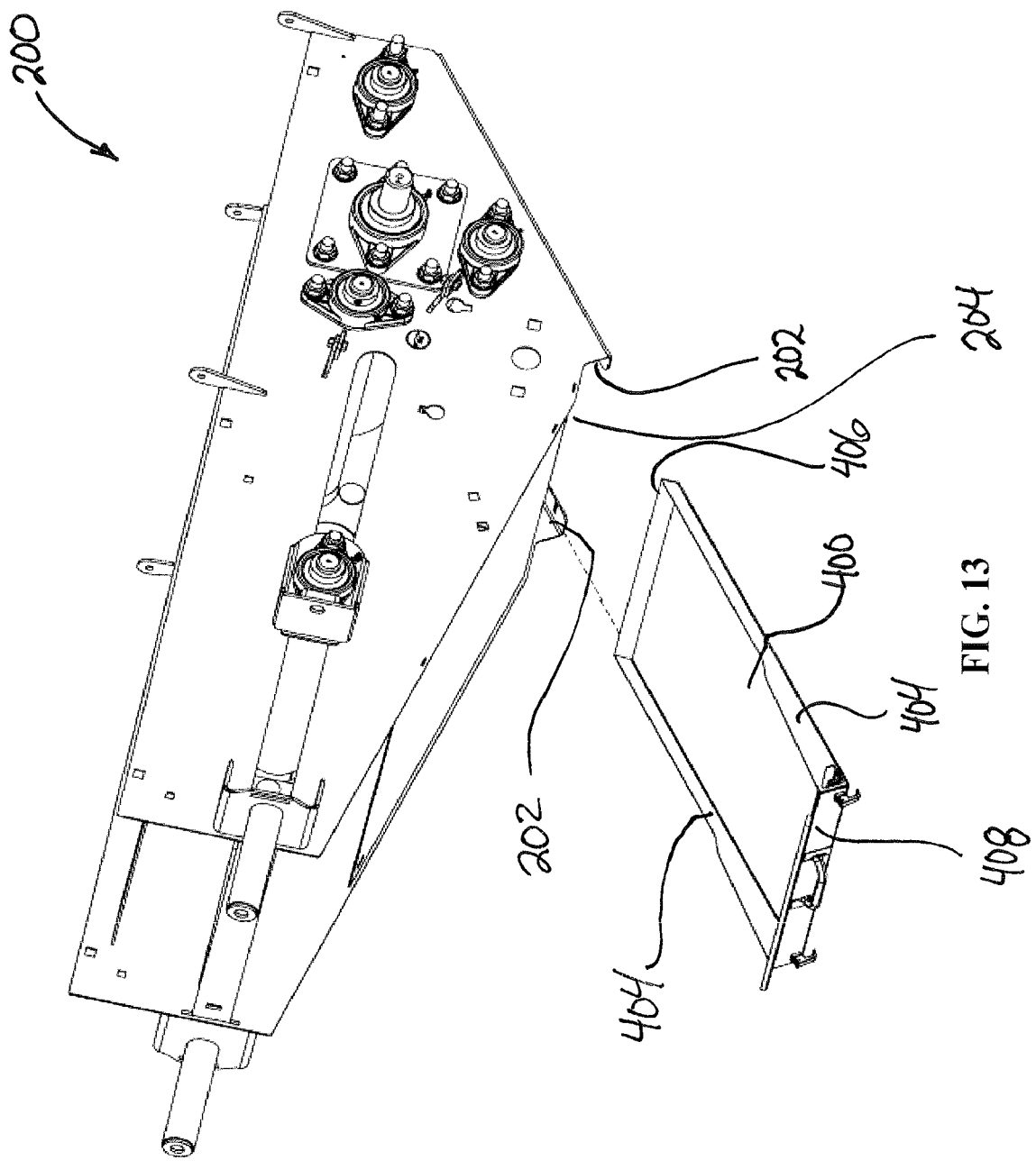
FIG. 13 is a perspective view of an s-drive and a removable collection tray.

FIG. 13 illustrates a removable collection tray 400 that can be provided in a lower portion of the s-drive section 200. Referring to FIGS. 11 and 13, the collection tray 400 can be used to collect any material that has been removed from the rollers in the s-drive section 200 by the second scraper 320, the third scraper 330 or otherwise fallen off the belt 50 or rollers in the s-drive section 200. The collection tray 400 can be positioned generally below the second scraper 320 and the third scraper 330 and the directing roller 240 and the idle roller 220, that the second scraper 320 and the third scraper 330, respectively, scrape material off of, so that any material removed by the second and third scrapers 320, 330 can fall into the collection tray 400.

The collection tray 400 can have a floor 402, side walls 404, a back wall 406 and a front wall 408 that define an area in which material to collect. The side walls 404 of the collection tray 400 can fit within channels 202 in the s-drive section 200 on either side of an opening 204 in the bottom of the s-drive section 200 so that the collection tray 400 can be inserted in these channels 202 and the collection tray 400 can cover the opening 204 in the bottom of the s-drive section 200.

Collection tray 400 can be used to collect any particulate material that may be remove from rollers in the s-drive section 200 or that may simply fall of the belt 50 in the s-drive section 200, such a dust, oilseeds, oil from crushed oilseed, or other particulate material. The s-drive section 200 will typically be above the gas engine powering the belt conveyor 10 so material buildup around the engine and muffler components can be prevented with the collection tray 400.

The collection tray 400 can simply be removed from its position at in the lower portion of the s-drive section 200 and any material that has collected in the collection tray 400 can be removed. If oilseeds are being transported in the belt conveyor 10, the oily nature of the oilseeds can cause the material collecting in the collection tray 400 to be sticky and gummy which can cause the built up material to clump together. The removable collection tray 400 can allow this oil material to be removed from the s-drive section 200 and managed.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A belt conveyor comprising:
   an intake end;
   a discharge end;
   a body extending between the intake end and the discharge end;
   a frame having ground wheels, the frame positioning the body in an inclined orientation;
   a hopper provided at the intake end, the hopper having an upper end and a lower end;
   a transition section having a first side wall and a second side wall, the transition section positioned between the hopper and the body;
   an s-roller assembly having a top s-roller and a bottom s-roller, the top s-roller assembly positioned at the upper end of the hopper;
   a belt having a first edge and a second edge, the belt traveling along a travel path in the belt conveyor, the belt traveling through an upper run in the hopper, over the top s-roller, under the bottom s-roller, through the transition section, up an upper run in the body to the discharge end and down a return run in the body, through a lower run in the hopper and back to the upper run in the hopper;
   a first wiper positioned in contact with a bottom surface of the belt and extending substantially the width of the bottom surface of the belt; and
   a back roller, the belt passing under the back roller before the belt passes through the lower run in the hopper;
   wherein the first wiper is positioned in contact with the bottom surface of the belt and extending substantially the width of the bottom surface of the belt in front of the back roller.

2. The belt conveyor of claim 1 wherein the first wiper comprises: a wiper member; a wiper mounting flange; and at least one fastener to attach the wiper member to the mounting flange.

3. The belt conveyor of claim 2 wherein the wiper member is formed of urethane.

4. The belt conveyor of claim 2 wherein the wiper member is positioned at an angle to a travel direction of the belt.

5. The belt conveyor of claim 2 wherein the wiper member has a point from which sides of the wiper member extend at an angle from the point.

6. The belt conveyor of claim 1 wherein the first wiper is positioned in contact with the bottom surface of the belt before the belt passes under the back roller in the belt conveyor.

7. The belt conveyor of claim 1 further comprising a front roller, the belt passing around the front roller after the belt passes through the lower run in the hopper and before the belt passes through the upper run in the hopper, wherein a second wiper is positioned in contact with the bottom surface of the belt and extending substantially the width of the bottom surface of the belt in front of the front roller.

8. A belt conveyor comprising:
   an intake end;
   a discharge end;
   a body extending between the intake end and the discharge end;
   a frame having ground wheels, the frame positioning the body in an inclined orientation;
   a hopper provided at the intake end, the hopper having an upper end and a lower end;

a transition section having a first side wall and a second side wall, the transition section positioned between the hopper and the body;

an s-roller assembly having a top s-roller and a bottom s-roller, the top s-roller assembly positioned at the upper end of the hopper;

a belt having a first edge and a second edge, the belt traveling along a travel path in the belt conveyor, the belt traveling through an upper run in the hopper, over the top s-roller, under the bottom s-roller, through the transition section, up an upper run in the body to the discharge end and down a return run in the body, through a lower run in the hopper and back to the upper run in the hopper;

a back roller, the belt passing under the back roller before the belt passes through the lower run in the hopper;

a front roller, the belt passing around the front roller after the belt passes through the lower run in the hopper and before the belt passes through the upper run in the hopper, a first wiper positioned in contact with a bottom surface of the belt and extending substantially the width of the bottom surface of the belt in front of the front roller.

9. The belt conveyor of claim 8 wherein the first wiper comprises: a wiper member; a wiper mounting flange; and at least one fastener to attach the wiper member to the mounting flange.

10. The belt conveyor of claim 9 wherein the wiper member is formed of urethane.

11. The belt conveyor of claim 9 wherein the wiper member is positioned at an angle to a travel direction of the belt.

12. The belt conveyor of claim 9 wherein the wiper member has a point from which sides of the wiper member extend at an angle from the point.

13. The belt conveyor of claim 8 wherein the first wiper is positioned in contact with the bottom surface of the belt before the belt passes under the front roller in the belt conveyor.

* * * * *